INVENTORS
Robert H. Schaefer &
Mark E. Fisher

ATTORNEY

United States Patent Office 3,293,934
Patented Dec. 27, 1966

---

3,293,934
TRANSMISSION
Robert H. Schaefer, Westfield, and Mark E. Fisher, Carmel, Ind., assignors to General Motors Corporation, Detroit, Mich., a corporation of Delaware
Filed Sept. 25, 1962, Ser. No. 226,021
12 Claims. (Cl. 74—472)

This invention relates to transmissions and particularly to a control system for power shifting transmission.

The control system is employed with a transmission having a torque converter and lockup clutch, a two-speed splitter gear unit and a three speed and reverse main gear unit. The two speed splitter gear unit provides a low and a high drive ratio in each of the ratios of the main gear unit to provide six forward drive ratios and two reverse drive ratios. The torque converter provides additional torque multiplication during each ratio change and until a proper output speed is reached in each ratio, then the lockup clutch is engaged to provide a lockup drive to the gearing. A manual selector valve having a single valve element, movable to a plurality of ratio positions, supplies fluid from the main line in each position to a selected pair of fluid operated ratio engaging devices each consisting of a fluid motor and a friction device, one being in the splitter gear unit and the other being in the main gear unit, to provide each ratio. The valve element has a longitudinally extending supply passage and exhaust passage each provided with a plurality of slot ports cooperating with annular ports in the valve bore in the valve body to provide the connections in the properly selected pairs for operating the fluid operated ratio engaging devices. In order to provide torque converter operation in each ratio, the lockup control valve operation by the splitter gear unit output governor pressure is modified by the splitter high engaging pressure so that the lockup clutch is engaged at a low speed when the transmission is in splitter low and at a relatively higher speed when the transmission is in splitter high.

An object of the invention is to provide in a transmission having a drive train including a torque converter, a lockup clutch, a splitter gear unit and a main gear unit, a control system having a manual selector valve with a movable valve element having a longitudinal fluid supply bore and a longitudinal exhaust bore and movable to a plurality of positions to supply fluid to engage selected pairs of the ratio engaging devices in each of the splitter gear unit and the main gear unit to provide a drive ratio in each position and a lockup shift valve operative to engage the lockup clutch when the splitter gear unit is in low ratio at a low speed and to engage the lockup clutch whenever the splitter gear unit is in high speed at a higher speed to provide converter drive at a particular converter speed in each drive ratio.

Another object of the invention is to provide in a transmission having a plurality of fluid operated ratio engaging devices engageable in pairs to provide a plurality of drive ratios, a selector valve having a single valve element axially movable in a bore to a plurality of positions and the valve element having an axial fluid supply passage and an axial exhaust passage with a plurality of slot ports in the valve element cooperating with a plurality of annular ports in the valve body to connect the fluid supplied to a plurality of pairs of said fluid operated ratio engaging devices.

Another object of the invention is to provide in a transmission having a drive including a torque converter and lockup clutch and gear unit, a gear unit output governor controlling a lockup shift valve to engage a lockup clutch during the operation of the transmission in each ratio and means controlled by the ratio selector mechanism operative on the lockup shift valve to provide for the engagement of the lockup clutch at a low gear unit output speed in low ratio and at a higher gear unit output speed in a higher ratio.

These and other objects of the invention will be more apparent from the following description and drawing of a preferred embodiment of the invention, illustrated in the accompanying drawing.

Figure 1:
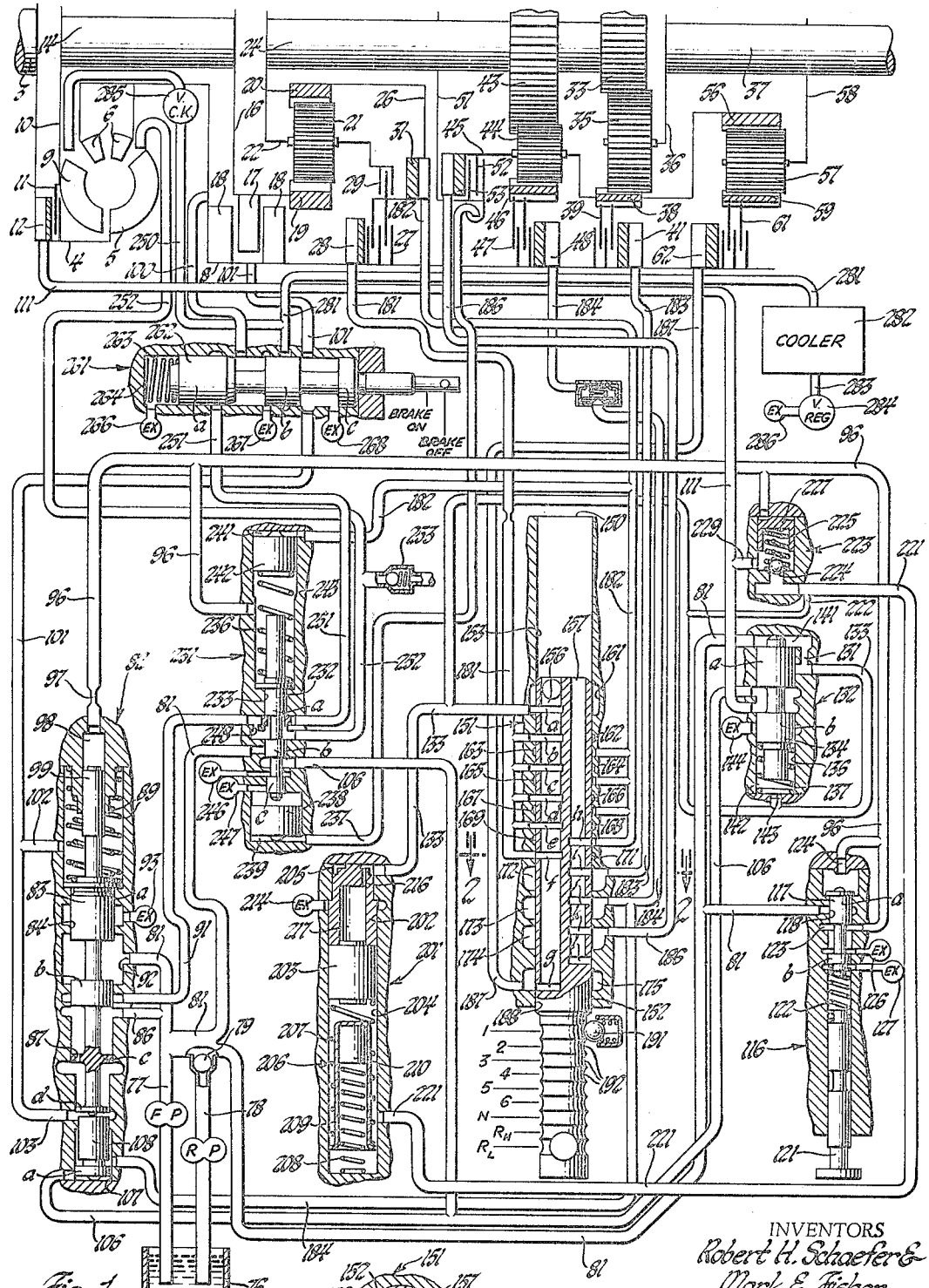
FIGURE 1 is schematically illustrates the transmission gearing and controls.
Figure 2:
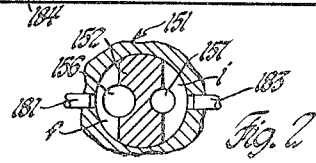
FIGURE 2 is a partial sectional view on the line 2—2 of FIGURE 1 showing a section of the manual selector valve.

The invention is illustrated in a transmission having an input shaft 3 driving a rotary torque converter housing 4. The torque converter housing 4 encloses the torque converter rotors, the pump 5, the stator 6, which may be a dual stator each connected by a one-way brake to the stationary transmission housing 8, and the turbine 9 connected by a hub 10 to the converter shaft 14. The fluid in the torque converter is circulated by the pump 5 through the turbine 9 and redirected by the stator 6 for entry to the pump to provide fluid torque multiplication drive in a conventional manner. The lockup clutch 11 has driving plates mounted on the rotary housing 4 and a driven plate connected to the hub 10, and operates on the supply of fluid to the lockup clutch motor 12 to engage the clutch 11 and connect the input shaft 3 to the converter shaft 14 to lockup the torque converter and substitute a direct mechanical drive for the fluid torque multiplying drive of the torque converter.

The converter shaft 14 drives a hub assembly 16 on which the hydrodynamic brake rotor 17 is mounted between the stators 18 which are fixed to the stationary housing 8.

The converter shaft 14 is connected by two speed splitter gear unit providing underdrive or low and direct or high to the intermediate shaft 24. The splitter gear unit has a ring gear 19 driven by the converter shaft 14 through hub 16 which meshes with planetary pinion 21 mounted on the carrier 22 which is connected to drive the intermediate shaft 24. The sun gear 20 is controlled to provide the two drives through the control hub 26 which for low is held stationary by the brake 27 consisting of a plurality of plates attached alternately to the hub 26 and the housing 8 and engaged by the splitter low motor 28. To provide high, the control hub 26 is connected by the clutch 29 having alternate plates attached to the control hub and the carrier 21 and actuated by the splitter high fluid motor 31.

The main gear unit provides low, intermediate, high and reverse drives. The low ratio drive is provided between the intermediate shaft 24 and the output shaft 37 by the low planetary gear set consisting of a plurality of planetary pinions 35 mounted on a carrier 36 connected to the output shaft 37 and meshing with the driving sun gear 33, fixed to the intermediate shaft 24, and with the controlled ring gear 38. The ring gear 38 is controlled by a brake 39 consisting of alternate plates attached to the ring gear and the housing 8 which are engaged by the low motor 41 to hold the ring gear for low ratio.

Intermediate ratio in the main gear unit is provided by the intermediate and low gear sets. The intermediate gear set has pinions 44 mounted on a carrier 45 connected to ring gear 38 and meshing with a larger sun gear 43 driven by the intermediate shaft 24 and the controlled ring gear 46. To provide intermediate ratio the ring gear 46 is held by the brake 47 consisting of alternate plates attached to the ring gear 46 and the housing and engaged by the intermediate motor 48 to drive ring gear 38 of the low gear set so the combined gear sets provide intermediate ratio.

High ratio in the main gear unit is a direct drive provided by locking up the main gear unit. The intermediate shaft 24 is connected to the clutch hub 51 and connectable by the clutch 52 to the carrier 45. The high clutch motor 53 is actuated to engage the plates of clutch 52 attached to both the hub 51 and the carrier 45 to cause the carrier 45 to rotate with the intermediate shaft 24 and lock up the main gear unit for direct drive.

Reverse drive is provided by the reverse gear set which has a plurality of pinions 57 rotatably mounted on a carrier 58 connected to drive the output shaft 37 and meshing with a sun gear 56 connected to rotate with the ring gear 38 and meshing with a ring gear 59. The brake 61 for controlling ring gear 59 consists of plates connected to the ring gear and housing 8 and is actuated by a reverse fluid motor 62 to hold the ring gear to provide reverse drive in the main gear unit.

In the splitter gear unit, either the splitter low motor or the splitter high motor are supplied with fluid to selectively provide either low or high ratio in the splitter gear unit, and the other motor is connected to exhaust. In the main gear unit fluid is selectively supplied to one of the low, intermediate, high and reverse motors and the others are exhausted to provide the selected one of the low, intermediate, high and reverse ratios. The controls permit engagement of reverse ratio of the main unit with either low or high in the splitter unit to provide a reverse low RL and a reverse high RH. Also, when the main unit is in low ratio, either low or high splitter gear unit may be engaged to provide respectively 1st and 2nd forward drive ratio. Similarly, with intermediate engaged in the main unit, low and high in the splitter unit provide 3rd and 4th ratio. With high in the main unit, splitter low and splitter high provide 5th and 6th ratio. Each of the fluid actuated ratio engaging friction devices consisting of a motor for actuating a ratio engaging clutch or brake is provided with suitable retraction springs (not shown) to disengage the clutch or brake on exhausting the control line connected to each motor. The lockup clutch motor may have suitable retraction springs or be disengaged by the fluid pressure in the torque converter housing.

Control system

The fluid which exhausts from the various exhaust ports EX, the lubrication system and other leakage collects in the sump 76 located in the lower portion of the stationary transmission housing 8. The front pump FP supplies fluid via the front pump line 77 and the rear pump RP supplies fluid via the rear pump line 78 and check valve 79 to the main line 81.

The pressure in main line 81 is regulated by the main line regulator valve 82 which has a valve element 83 having lands $a$, $b$, $c$ of equal diameter and land $d$ of smaller diameter located in a stepped bore 84 in the valve body. In the closed position shown, main line 81 is connected by port 86 to the space between land $b$ and $c$ and passes through the aperture 87 in land $c$ to act on the unbalanced area between land $c$ and $d$ to bias the valve element 83 upwardly against the dual spring 89. As the pressure in main line 81 reaches the regulated value the valve element moves upwardly against the biasing force of the springs 89 and connects port 86 to the converter and brake feed line 91 which, as explained below, provides the feed for both the converter and brake after the main line has reached regulated pressure. The orifice 87 in land $c$ or other flow restricting means bypassing land $c$ damps the regulating action of the valve. When the main line and converter brake feed line 91 are at regulated pressure, further excess fluid supply in main line 81 will raise the valve further so that main line port 92 is directly connected to exhaust port 93.

The regulated main line pressure may be increased or decreased by the following control functions. The throttle pressure which is controlled by throttle valve 116 proportional to torque demand or the throttle pedal position, described below, is supplied by line 96, through orifice 97 which damps the regulating action of throttle pressure, to a bore 98 where the throttle pressure acts on the piston 99 which engages the valve element 83 to increase the main line regulated pressure with increasing torque demand. The brake outlet line 101 is connected by branch 102 to the spring chamber to act downwardly on the land $a$ of the valve element 83 tending to increase the main pressure, and the brake outlet line branch 103 is connected to act upwardly on the land $d$ to decrease the pressure a lesser amount to provide a net increase in main line pressure with increasing brake outlet pressure. As is known in the art, the brake outlet line 101 is connected to the brake operating chamber radially outward from the rotor 17 by means of a centrifugal type outlet as employed in centrifugal pump so that the pressure in line 101 will be proportional to the braking torque being absorbed by the hydrodynamic brake. The lockup shift line 106 is connected to bore 107 to act on the land $a$ of plug 108 to urge valve element 83 upwardly to reduce main line pressure whenever the lockup shift valve has shifted to supply fluid to the lockup shift line 106. In intermediate ratio, the intermediate line 184 is connected to bore 107 above land $a$ to act downwardly on land $a$ with a reduced force to reduce the degree of pressure reduction due to lockup shift line pressure when in intermediate ratio.

The main line 81 is also connected to the throttle valve 116 which has a valve element 117 having lands $a$ and $b$ located in a bore 118. The actuating rod 121, whose position is controlled by the position of the accelerator pedal or in accordance with fuel supply demand varies the pressure of spring 122 acting on the throttle regulator valve 117 to provide a pressure in throttle pressure line 96 proportional to throttle pedal position or torque demand. This valve operates in a conventional manner with the spring 122 biasing valve element 117 to the open position where the main line 81 is connected between the lands $a$ and $b$ to port 123 to supply throttle pressure line 96. Line 96 is connected by port 124 to act on the unbalanced end area of land $a$ to oppose the biasing force of the spring to move the valve toward the exhaust position blocking line 81 and connecting throttle valve line 96 via port 123 to exhaust 126. Exhaust 127 vents the spring chamber portion of the bore 118.

The main line 81 is also connected through the orifice 131 at the lockup clutch cutoff valve 132 to the ratio supply line 133 which supplies fluid to all ratio engaging motors. The lockup clutch cutoff valve 132 has a valve element having lands $a$ and $b$ of equal diameter located in a bore 136. The valve element 134 is biased to the position shown by the spring 137 connecting the lockup shift line 106 supplied by the lockup shift valve to the lockup clutch line 111 which is connected to the lockup clutch motor 12 to engage the lockup clutch. When there is flow from the main line 81 through the orifice 131 to the ratio supply line 133 to supply ratio motor for engagement, the higher pressure in the chamber 141 on the upstream side of orifice 131 overcomes the spring and the lower pressure in the chamber 142 at the other end of the valve supplied by port 143 on the downstream side of orifice 131 to move the valve element 134 downwardly blocking lockup shift line 106 and connecting lockup clutch line 111 to exhaust 144 to disengage the lockup clutch.

The manual selector valve 151 has a valve element 152 of uniform diameter axially slidable in a bore 153. The valve element 152 has a pair of cored or drilled passages, the supply passage 156 is blocked at both ends and has a series of supply ports $a$, $b$, $c$, $d$, $e$, $f$ and $g$ and the exhaust passage is open at one end to provide an exhaust out the end 150 of the bore 153 and has a plurality of exhaust ports *h, i, j, k* and *l*. The ports are transverse slots intersecting one of the passages. The valve bore 153 has a series of annular feed ports comprising successively a double width port 161, single width ports 162, 163, 164, 165, 166, 167, 168, 169, 171 and double width ports 172, 173, 174 and 175. The ratio supply line 133 is connected to the double width feed port 161. The splitter low line 181 connected to splitter low motor 28 is connected to the single width feed ports 162, 164, 166, 168 and 171. The splitter high line 182 connected to the splitter high motor 31 is connected to the single width feed ports 163, 165, 167, 169. The low feed line 183 is connected to the low motor 41, the intermediate feed line 184 is connected to the intermediate motor 48 and the high clutch line 186 is connected to the high clutch motor 53 and each is respectively connected to the double width feed ports 172, 173 and 174. Reverse line 187 connected to reverse motor 62 is similarly connected to feed port 175. The stationary feed ports are all in the bore and the supply and exhaust ports are all in the valve element.

With the valve in the reverse low position RL shown, the fluid is supplied from ratio supply line 133 via feed port 161 and supply port *a* to supply passage 156, through all supply ports *b* through *f* and feed ports 162, 164, 166 and 168 and 171 respectively to splitter low line 181 and through supply port *g* and feed port 175 to reverse line 187. Splitter high line 182, low line 183, intermediate line 184 and high clutch line 186 are connected respectively via exhaust ports *h* through *k* to exhaust passage 157. On movement of the valve element to the reverse high position RH, supply port *a* will move to the upper end of feed port 161 and thus ratio supply line 133 remains connected to the supply passage 156. The supply ports *c, d, e* and *f* are connected respectively to feed ports 163, 165, 167 and 169 to supply main line pressure to the splitter high line 182. The splitter low line 181 is connected at feed ports 168 and 171 to exhaust parts *h* and *i* for exhaust via passage 157. Supply port *g* of the supply passage remains connected to reverse feed port 175 to supply reverse motor 62.

In neutral position, ratio supply line 133 is connected via supply port *b* to passage 156 and via supply ports *c* through *f* to splitter low line 181. Splitter high line 182 is connected via exhaust ports *h* and *i* to exhaust 157. Low port 172, intermediate port 173 and high port 174 are connected respectively by exhaust ports *j, k* and *l* to exhaust 157. Reverse port 175 is connected to the exhaust 188 at the lower end of the valve bore.

In sixth ratio position 6th supply line 133 is connected through supply port *b* to supply passage 156 which supplies through supply ports *d, e* and *f* the feed ports 163, 165 and 167 for the splitter high line 182. Supply passage 156 is also connected via supply port *g*, feed port 174 and high clutch line 186 to the high motor 53. Splitter low line 181 is connected by feed ports 166, 168 and 171 respectively to exhaust ports *h, i* and *j* to exhaust 157. Low feed port 172 and intermediate feed port 173 are connected via exhaust ports *k* and *l* to exhaust 157. Reverse feed port 175 to connected to exhaust at 188.

In the fifth ratio position, ratio supply line 133 is connected via supply port *c* to the passage 156 and via supply ports *d, e* and *f* to splitter low line 181 and via supply port *g* to the high ratio feed port 174 and line 186. Splitter high line 182 is connected via exhaust ports *h, i* and *j* to exhaust 157 and low and intermediate are connected via exhaust ports *k* and *l* to the same exhaust. Reverse remains connected to exhaust 188.

In fourth ratio, ratio supply line 133 is connected via supply port *c* to supply passage 156 and via supply ports *e* and *f* to splitter high line 182. The supply port *g* is connected to the feed port 173 and intermediate line 184. Now both the high port 174 and reverse port 175 are connected to exhaust 188. The splitter low line 181 is connected by exhaust ports *h* through *k* to exhaust 157 and low is connected by exhaust port *l* to this exhaust.

From the above it is believed clear that in third ratio position 3rd, the ratio supply line is connected via passage 156 to splitter low line 181 and intermediate line 184. In second position 2nd, the supply is connected to the low ratio line 183 and the splitter high line 182. In first position 1st, low remains connected and splitter low line 181 is connected. In each of these positions all the other lines are connected to exhaust. The spring detent 191 cooperating with a plurality of grooves 192 holds the valve element 152 in each of the ratio positions.

The trimmer valve 201 has a valve element 202 and a valve plug 203 located in a bore 204 having a reduced diameter portion 205 extending to exhaust 214. A dual spring 206 consists of a first spring 207 and a second spring 208 interconnected by a cup-shaped element 209 providing an internal abutment at the base and an external abutment at the lip which permits the springs to overlap to provide greater spring length in the limited valve bore to reduce the spring rate. The plug 210 in the base of the cup 209 makes it possible to use a longer cup with springs of this length to stop movement of plug 203 to limit the gradual pressure rise to a predetermined value. When the lockup shift valve 231 and the lockup cutoff valve 132 are both in lockup position for engaging the lockup clutch line 221 is supplied with fluid at main line pressure to bore 204 to assist spring 206 to bias the plug 203 and the valve 202 to the closed position closing the exhaust 214. Under these conditions, whenever pressure is lockup clutch line 111 is vented to exhaust 144 by operation of the lockup cutoff valve 132, due to the initiation of filling of a ratio motor, valve 223 regulates to pressure in line 221 connected to bore 204 at a low value. Then since valve 201 is in the position shown, the low pressure in line 133 will move the valve 202 and plug 203 down against spring 206 and the lower pressure in bore 204 to permit exhaust at 214 to regulate the pressure in line 133 at a low value. Simultaneously there will be a slow flow of fluid from line 133 through orifice 216 to cavity 217 within the valve elements 202 to gradually separate the valve element 202 and the plug 203 to increase the biasing force provided by spring 206 to gradually increase the main line pressure to the main line regulated pressure to provider soft ratio engagement during the gradual pressure rise at low pressure values. When the main line pressure from line 133 flows into small bore 205 it acts on the free end of valve 202 and also flows through orifice 216 to fill chamber 217 and act on the other end of valve 202 which is in bore 204 and has a larger area than the free end. Thus the fluid causes the valve 202 to gradually move away from plug 203.

The trimmer valve 201 does not function during converter operation. Valve 223 maintains a low pressure in line 221 during conventer operation since lockup clutch line 111 and its branch 229 are connected by lockup cutoff valve 132 to lockup shift line 106 which is connected by the lockup shift valve 231 in the downshift or converter operation position to exhaust 246. This low pressure in line 221 is insufficient to enable spring 206 to move the plug 203 to the upper position shown in contact with valve element 202 to initiate a regulation cycle.

A low signal pressure is supplied by line 221 to the spring chamber portion of bore 204 to assist the spring 206 to provide an additional biasing force acting on the plug 203 proportional to throttle pressure during a ratio change made while the transmission operating with the lockup shift valve upshifted for lockup clutch engagement pressure and the same gradual increase of pressure from to provide an initial low pressure proportional to throttle each initial pressure. Line 221 is supplied from the ratio supply line 133 by a restricted branch line 222 providing a restricted supply to fluid to line 221. The pressure in line 221 is regulated by a ball regulator valve 223 having a ball 224 biased by a spring 225, whose biasing force is adjusted by a piston 227 whose position is controlled by throttle pressure from line 96. A branch 229 of lockup clutch line 11 supplies lockup clutch fluid to the spring chamber of valve 223 to hold the ball 224 on its seat permitting pressure supplied via line 222 to line 221 to supply line pressure at a restricted rate of increase to the spring chamber of trimmer valve 201 to reset the trimmer valve quickly, but not so fast as to cause shock, to the position shown so that it is ready for the next regulating cycle. When the lockup shift valve 231 is down in converter operation position lockup shift line 106 is exhausted, so lockup clutch line 111 is exhausted regardless of the position of lockup cutoff valve 132 so valve 223 supplies low pressure to line 221 which is insufficient to set trimmer valve 201 for operation. When the lockup shift valve upshifts, main pressure is supplied by line 106, lockup cutoff valve 132 in the normal position shown and line 111 to engage the lockup clutch and act via branch 229 to hold valve 223 to supply main pressure to line 221 to set trimmer valve 201. On a ratio shift during lockup operation the lockup cutoff valve 132 downshifts to exhaust line 111 to disengage the lockup clutch and exhausts branch 229 so valve 223 supplies low pressure by line 221 to the trimmer valve 201 to, in conjunction with the drop in main pressure in line 133, start a trimmer valve regulation cycle. On engagement of the ratio the lockup shift valve upshifts to supply line 111 to engage the lockup clutch and supply branch 229 so valve 223 sends main pressure by line 221 to reset the trimmer valve.

The lockup shift valve 231 has a valve element 232 having lands *a*, *b* and *c* of consecutively reduced diameters located in a stepped bore 233. The spring 236 and throttle pressure connected via line 96 to the spring chamber portion of bore 233 biases the valve element 232 to the downshift position shown with a low biasing force permitting an upshift due to governor pressure supplied by governor pressure line 237 acting on governor plug 238 in chamber 239 to act on the valve element to upshift it at a low speed of intermediate shaft 24. When the splitter high ratio is engaged, the pressure in line 182 enters bore 241 and acts on abutment piston 242 to move the abutment piston against the stop shoulder 243 to increase the biasing force of spring 236 requiring a higher intermediate shaft speed and governor pressure acting on plug 238 to upshift the valve element 232. Thus the lockup clutch is engaged at the same converter output speed in both splitter low and high drives at each throttle pedal position.

In the downshift position shown, the main line 81 is blocked by the land *b* and the lockup shift line 106 is connected to exhaust 246 for disengagement of the lockup clutch. The chamber between the valve element 232 and governor plug 238 is vented by exhaust 247. The converter and brake feed line 91 is connected freely bypassing orifice 248 between the lands *a* and *b* to the brake feed line 251 and the converter feed line 252. On an upshift the land *b* blocks intercommunication between the brake feed line 251 and the converter feed line 252 and thus provides full feed to the brake feed line and restricted feed through orifice 248 to the converter feed line 252. At the same time, the main line 81 is connected between the lands *b* and *c* to the lockup shift line 106 to engage the lockup clutch if the lockup clutch cutoff valve 132 is in normal position shown. The relief valve 253 limits pressure in the converter feed line 252.

The brake valve 261 has a valve element 262 having equal diameter lands *a*, *b* and *c* located in a bore 263 and biased to a brake off position by the spring 264. The spring chamber is vented by exhaust 266. In the brake off position shown, the brake feed line 251 is blocked by land *a*. The brake inlet line 100 and the brake outlet line 101 are connected respectively to exhausts 267 and 268. The converter outlet line 250, having nonreturn check valve 285 connects to line 281, and cooler 282. When the brake valve element 262 is moved against spring 264 to the brake on position, the brake supply line 251 is supplied gradually on flow valve movement due to the tapered land *a* to the brake inlet line 100, and the brake outlet line 101, while remaining connected to the continuation thereof to the main line regulator valve, is disconnected from exhaust 268 and connected to the cooler inlet line 281. The cooler inlet line 281 is connected through a cooler 282 and cooler outlet line 283 has a lubrication feed branch and a regulator valve 284 limiting the pressure to a low value and connecting the excess fluid to exhaust 286.

*Operation*

With the manual selector valve 152 in neutral, and the engine operating, the front pump driven by the engine preferably from the converter pump housing 4 in a conventional manner will supply fluid to the main line 81 which will be regulated by the regulator 82 as explained above. The manual selector valve 151 will supply main line pressure from the ratio supply line 133 to the splitter low line 181 to actuate the splitter low motor 28 to engage the splitter low brake 27 to provide low ratio in the splitter gear unit. All the ratio motors in the rear unit are disengaged since their supply lines are connected to exhaust by the manual selector valve 151. This provides a positive neutral. The lockup clutch shift valve 231 will be in the downshift position shown providing full brake and converter supply via lines 251 and 252 and blocking the supply to the lockup shift line 106.

On a shift to first ratio the manual selector valve maintains the connection from the ratio supply line to the splitter low line 181 and provides a connection to the low line 183 to actuate the low motor 41 to engage the low brake 39 to provide low ratio in the transmission. The flow of fluid to engage low ratio passing through orifice 131 shifts lockup cutoff valve 132 to cut off the connection between the lockup shift line 106 and the lockup clutch line 111 and to connect lockup clutch line 111 to exhaust 114 to insure disengagement of the lockup clutch and to exhaust the pressure from the spring chamber of valve 223 via exhaust 144 to condition the signal pressure regulator valve 223 to regulate the pressure in line 221 at a low pressure proportionate to throttle pedal position and thus condition the trimmer valve 201 for operation. When the transmission is in lockup drive, during each ratio engagement the trimmer valve controls the pressure in line 133 to provide an initial low pressure proportional to torque demand and then gradually increases the pressure until the drive is engaged and slip stops and then more quickly raises the pressure to main line pressure for engaging the ratio motor with a soft initial engagement and a nonslip final engagement. On shifts made while the converter is operating, since the lockup shift valve 231 has not upshifted, the trimmer valve is not set and does not function to reduce main pressure and shifting.

The manual selector valve may be moved to each of the six forward and two reverse positions as explained above to provide these ratios. On each shift the lockup clutch cutoff valve acts on the above initial shift to first ratio to condition the trimmer valve 201 to control the pressure for gradual engagement of the ratio.

When the transmission is in first, third, fifth and reverse low ratios splitter low is engaged and splitter high line 182 is exhausted at the manual valve 151, so the abutment plug 242 of lockup shift valve 231 is in the upper position shown providing a lockup shift at a low intermediate shaft speed varying with throttle pressure supplied by line 96. When the transmission is in second, fourth, sixth and reverse high main line pressure is supplied to line 182 to engage the splitter high ratio and this pressure acts on the abutment plug 242 to move it to the stop shoulder 243 to increase the biasing force of spring 236 to provide a lockup shift at a higher speed, having the same proportion the lower speed shift point as the proportion of the change in intermediate shift speed provided by the splitter low to splitter high shift. The throttle pressure in line 96 is always less than main line pressure so that it does not prevent operation of abutment plug 242 by main line pressure.

The above described preferred embodiment is illustrative of the invention defined in the appended claims.

We claim:

1. In a transmission, a multiratio gear unit having a plurality of fluid actuated ratio establishing devices engaged in a plurality of pairs to provide a plurality of ratios, a source of fluid under pressure, a shift valve means operably connecting said source to each of said plurality of fluid actuated ratio establishing devices having a valve element reciprocably mounted in a bore, said valve element including a longitudinal blind passage having a plurality of supply ports, and longitudinal exhaust passage means having a plurality of exhaust ports, said bore having a plurality of feed ports, said supply and exhaust and feed ports being arranged to selectively connect said source to pairs of said fluid actuated ratio establishing devices and to connect the other ratio establishing devices to said exhaust passage means.

2. In a control for supplying a plurality of fluid actuated devices actuated in a plurality of pairs, a source of fluid under pressure, valve means operably connecting said source to each of said plurality of fluid actuated devices having a valve element reciprocably mounted in a bore, said valve element including a longitudinal blind passage closed at both ends and having a plurality of supply ports, and longitudinal exhaust passage means having a plurality of exhaust ports, said bore having a plurality of feed ports with one connected to said source and the others connected to said fluid actuated devices, said supply and exhaust and feed ports being arranged to selectively connect said source to pairs of said fluid actuated devices and to connect the other fluid actuated devices to said exhaust passage means.

3. In a valve for connecting a source to each of said plurality of fluid actuated devices, a valve body having a bore, a valve element reciprocally mounted in said bore, said valve element including a longitudinal blind passage closed at both ends and having a plurality of supply ports, and exhaust means including a longitudinal exhaust passage having a plurality of exhaust ports, said bore having a source port for connection to a source and a plurality of feed ports for connection to a plurality of fluid actuated devices, said supply, exhaust, source and feed ports being arranged to connect said source port to said blind passage to selectively connect said source port through said blind passage to selected pairs of said feed ports and to connect the other feed port to said exhaust means.

4. In a control, a plurality of fluid actuated devices actuated in a plurality of pairs, a source of fluid under pressure, valve means operably connecting said source to each of said plurality of fluid actuated devices having a valve element reciprocally mounted in a bore, said valve element including a longitudinal blind passage closed at both ends and having a plurality of supply ports, and a longitudinal exhaust passage means having a plurality of exhaust ports exhausting at both ends of said valve element, said bore having a plurality of feed ports with one connected to said source and the others connected respectively to said fluid actuated devices, said supply and exhaust and feed ports being arranged to connect said one feed port to said blind passage in all valve positions and to selectively connect said source via pairs of supply ports and feed ports to pairs of said fluid actuated devices and to connect the other fluid actuated devices via their feed ports to said exhaust passage means.

5. In a valve, a valve body having a bore and a source port and a plurality of feed ports, a valve element reciprocally mounted in said bore, said valve element including a longitudinal blind passage closed at both ends and having a plurality of supply ports, and longitudinal exhaust passage means having a plurality of exhaust ports, said supply, exhaust source, and feed ports being arranged with one supply port connected to said source port in all valve positions and the other supply ports connected to supply said feed ports in selected pairs in each position of the valve element and the other feed ports being connected by said exhaust ports to exhaust to selectively connect said source to pairs of said feed ports and to connect the other feed ports to said exhaust passage means.

6. In a transmission; an input shaft; a converter shaft; an intermediate shaft; an output shaft; a torque converter and a fluid operated lockup clutch connecting said input shaft to said converter shaft; a first gear unit connecting said converter shaft to said intermediate shaft having a low ratio and a high ratio fluid operated drive establishing means selectively operable to provide low and high drive ratios; a second multiratio gear unit connecting said intermediate shaft to said output shaft having a plurality of fluid operated drive establishing means selectively operable to provide a plurality of ratios; a source of fluid under pressure; governor means providing a governor pressure proportional to intermediate shaft speed; torque demand means providing a torque demand pressure proportional to torque demand; a lockup shift valve having a valve element governor pressure responsive means operatively connected to said governor means to receive governor pressure to move said valve for upshift, a shift pressure controlled spring abutment, a biasing spring between said valve element and said spring abutment urging said valve element to downshift and a closed chamber between said valve element and spring abutment connected to said torque demand means to receive said torque demand pressure for acting on said valve element operative in response to governor pressure overcoming said biasing pressure and torque demand pressure at a predetermined speed to connect said source to said lockup clutch to engage said lockup clutch; selector valve means operably connected to said source and to said fluid operated drive establishing means of said first and second gear units to selectively connect said source to pairs of said drive establishing means to provide a plurality of drive ratios and including means operative when fluid is connected to said high ratio fluid operated drive establishing means operative to supply pressure to said shift pressure controlled abutment to move said abutment a controlled distance to increase the biasing force of said biasing spring to control said lockup shift valve to provide an upshift to engage the lockup clutch at a predetermined higher governor speed and pressure.

7. In a transmission; multiratio drive means including a plurality of fluid operated ratio establishing devices; a source of fluid under pressure; selector valve means connecting said source to said fluid operated ratio establishing devices selectively operable to selectively connect said source to said fluid operated ratio establishing devices; a regulator valve having, a bore, a valve element and a valve plug located in the bore, means between said valve element and valve plug providing a chamber, and biasing means engaging said valve plug to move said valve plug and valve element in a valve closing direction; said valve element controlling the exhaust of fluid from said source to regulate the pressure of said source; said source being connected by a first restriction to said expanding chamber; fluid operated means operative on receiving fluid to provide an additional biasing force on said valve plug and valve element in the same direction as said biasing means; a passage, a second restriction connecting said source to said passage operative to supply a restricted flow of fluid to said fluid operated means; a second regulator valve operative to control the pressure of the fluid in said supply passage at a pressure proportional to torque demand.

8. In a transmission; drive means for establishing a drive; a control system including fluid actuator means connected to said drive means for establishing said drive means in response to the supply of fluid to said fluid actuator means; fluid supply means connected to said fluid actuator means to supply fluid to said fluid actuator means to establish said drive means; and a regulator valve including a valve body having a bore with a closed end, a first valve element having one face facing the closed end of said bore providing an area on which fluid acts and an opposite face providing a larger area on which fluid acts; a second valve element having a face adjacent said first valve element, biasing means biasing said second valve element into engagement with said first valve element and both valve elements toward said closed end of said bore, an exhaust port in said bore, said bore having inlet port means connecting said source to said bore to act on said one face to move said valve element against said biasing means to open said exhaust to regulate the pressure of said source, means connecting said source to said bore between aid first and second valve elements to slowly supply fluid between said valve elements to slowly increase the regulated pressure.

9. In a transmission; drive means for establishing a drive; a control system including fluid actuator means connected to said drive means for establishing said drive means in response to the supply of fluid to said fluid actuator means; fluid supply means to supply fluid under pressure to said fluid actuator means; and a regulator valve including a valve body having a bore with a closed end, a first valve element having one face facing the closed end of said bore providing an area on which fluid acts and an opposite face providing a large area on which fluid acts, an orifice extending through said first valve element from said one face to said opposite face, a second valve element reciprocally mounted in said bore for engagement with said first valve element and having an adjacent face facing said first valve element, an inlet port connected to said fluid supply means located at the closed end of said bore to act on said one end face and pass through said orifice to act on said opposite end face and the adjacent face of said second valve element, an exhaust port spaced from said inlet port, variable biasing means engaging said second valve element with a high force to urge said first and second valve element toward the closed end of said bore against fluid under pressure acting on said adjacent face of said second valve element and controllable to reduce the biasing force to provide regulation at an initial low pressure and a gradually increasing pressure and then to increase the biasing force to said high force.

10. In a transmission; drive means for establishing a drive; a control system including fluid actuator means connected to said drive means for establishing said drive means in response to the supply of fluid to said fluid actuator means; fluid supply means to supply fluid under pressure to said fluid actuator means; and a regulator valve including a valve body having a bore with a closed end and a reduced diameter portion adjacent said closed end, a first valve element having a small diameter portion fitting said small diameter bore portion and a larger diameter portion fitting said bore, an orifice extending through said first valve element, a second valve element reciprocally mounted in said bore for engagement with said first valve element, biasing means engaging said second valve element to urge said first and second valve element toward the closed end of said bore, an inlet port connected to said fluid supply means located at the closed end of said bore, and an exhaust port spaced from said inlet port.

11. The invention defined in claim 10 and said biasing means including means operative in one control condition to bias both valve elements to the closed end of said bore to block said exhaust port and operative in a second control condition to reduce the force of said biasing means to initially provide a low pressure and operative in a third control condition to provide insufficient biasing force to move both said valve elements to said closed end of said bore to render said regulating valve inoperative.

12. The invention defined in claim 10 and said biasing means including means operative in one control condition to bias said second valve element into operative engagement with said first valve element and said first valve element toward the closed end of said bore to close said exhaust port to render said regulator valve operative to regulate, and operative in a second control condition to provide insufficient biasing force to bias said second valve element into operative engagement with said first valve element to render said regulator valve inoperative to regulate and operative in a third control condition only following said first condition to cause said regulator valve to initiate regulation at a low pressure and to gradually increase the pressure.

References Cited by the Examiner
UNITED STATES PATENTS

| | | | |
|---|---|---|---|
| 1,765,090 | 6/1930 | Morin | 251—76 |
| 2,244,213 | 6/1941 | Patton | 277—57 |
| 2,869,400 | 1/1959 | Langdon | 74—765 |

DAVID J. WILLIAMOWSKY, *Primary Examiner.*

DON A. WAITE, *Examiner.*

UNITED STATES PATENT OFFICE
CERTIFICATE OF CORRECTION

Patent No. 3,293,934                        December 27, 1966

Robert H. Schaefer et al.

It is hereby certified that error appears in the above numbered patent requiring correction and that the said Letters Patent should read as corrected below.

Column 5, line 38, for "parts" read -- ports --; line 60, for "to", first occurrence, read -- is --; column 6, line 30, for "is" read -- in --; line 33, for "to" read -- the --; line 69, beginning with "pressure" strike out all to and including "throttle" in line 70, same column 6, and insert instead -- to provide an initial low pressure proportional to throttle pressure and the same gradual increase of pressure from --; line 73, for "to" read -- of --; column 7, line 3, for "11" read -- 111 --; column 9, line 1, for "shift" read -- shaft --.

Signed and sealed this 26th day of September 1967.

(SEAL)
Attest:

ERNEST W. SWIDER                        EDWARD J. BRENNER
Attesting Officer                     Commissioner of Patents